(12) United States Patent
Ashibe et al.

(10) Patent No.: US 6,888,060 B2
(45) Date of Patent: May 3, 2005

(54) TERMINAL STRUCTURE OF EXTREME-LOW TEMPERATURE EQUIPMENT

(75) Inventors: Yuuichi Ashibe, Osaka (JP); Masayuki Hirose, Osaka (JP); Kouhei Furukawa, Osaka (JP); Yoshihisa Takahashi, Tokyo (JP); Kimiyoshi Matsuo, Tokyo (JP); Shoichi Honjo, Tokyo (JP); Tomoo Mimura, Tokyo (JP); Terumitsu Aiba, Tokyo (JP)

(73) Assignees: Sumitomo Electric Industries, Ltd., Osaka (JP); The Tokyo Electric Power Company, Incorporated, Tokyo (JP)

( * ) Notice: Subject to any disclaimer, the term of this patent is extended or adjusted under 35 U.S.C. 154(b) by 0 days.

(21) Appl. No.: 10/257,570

(22) PCT Filed: Feb. 13, 2002

(86) PCT No.: PCT/JP02/01177

§ 371 (c)(1),
(2), (4) Date: Apr. 3, 2003

(87) PCT Pub. No.: WO02/065605

PCT Pub. Date: Aug. 22, 2002

(65) Prior Publication Data

US 2003/0154727 A1 Aug. 21, 2003

(30) Foreign Application Priority Data

Feb. 13, 2001 (JP) ........................................ 2001-035821

Mar. 16, 2001 (JP) ........................................ 2001-076951

(51) Int. Cl.$^7$ ................................................. H01B 7/34
(52) U.S. Cl. ........................................................ 174/15.3
(58) Field of Search ............................... 174/15.3, 15.6, 174/15.5, 18

(56) References Cited

U.S. PATENT DOCUMENTS 3,801,723 A * 4/1974 Kubo et al. ................. 174/15.3
3,959,576 A * 5/1976 Penczynski et al. ........ 174/15.3

FOREIGN PATENT DOCUMENTS

| JP | 53-132794 | 11/1978 |
| JP | 63-146426 | 9/1988 |

* cited by examiner

Primary Examiner—Chau N. Nguyen
(74) Attorney, Agent, or Firm—Foley & Lardner LLP (57) ABSTRACT

A terminal structure of cryogenic equipment for leading a terminal of cryogenic equipment 100 from a very low temperature portion to a room temperature portion through a bushing, having a feature in that a connecting/heat-insulating portion 300 adiabatically connected with the aforementioned very low temperature portion 200 and the aforementioned room temperature portion 400 is provided along the outer circumference of the aforementioned bushing 30 between the aforementioned very low temperature portion 200 and the aforementioned room temperature portion 400.

10 Claims, 7 Drawing Sheets

PRIOR ART

TERMINAL STRUCTURE OF EXTREME-LOW TEMPERATURE EQUIPMENT

TECHNICAL FIELD

The present invention relates to a terminal structure for leading a conductor of cryogenic equipment from very low temperature to room temperature. Particularly it relates to a terminal structure superior in adiathermancy or insulation performance.

BACKGROUND ART

Figure 7:
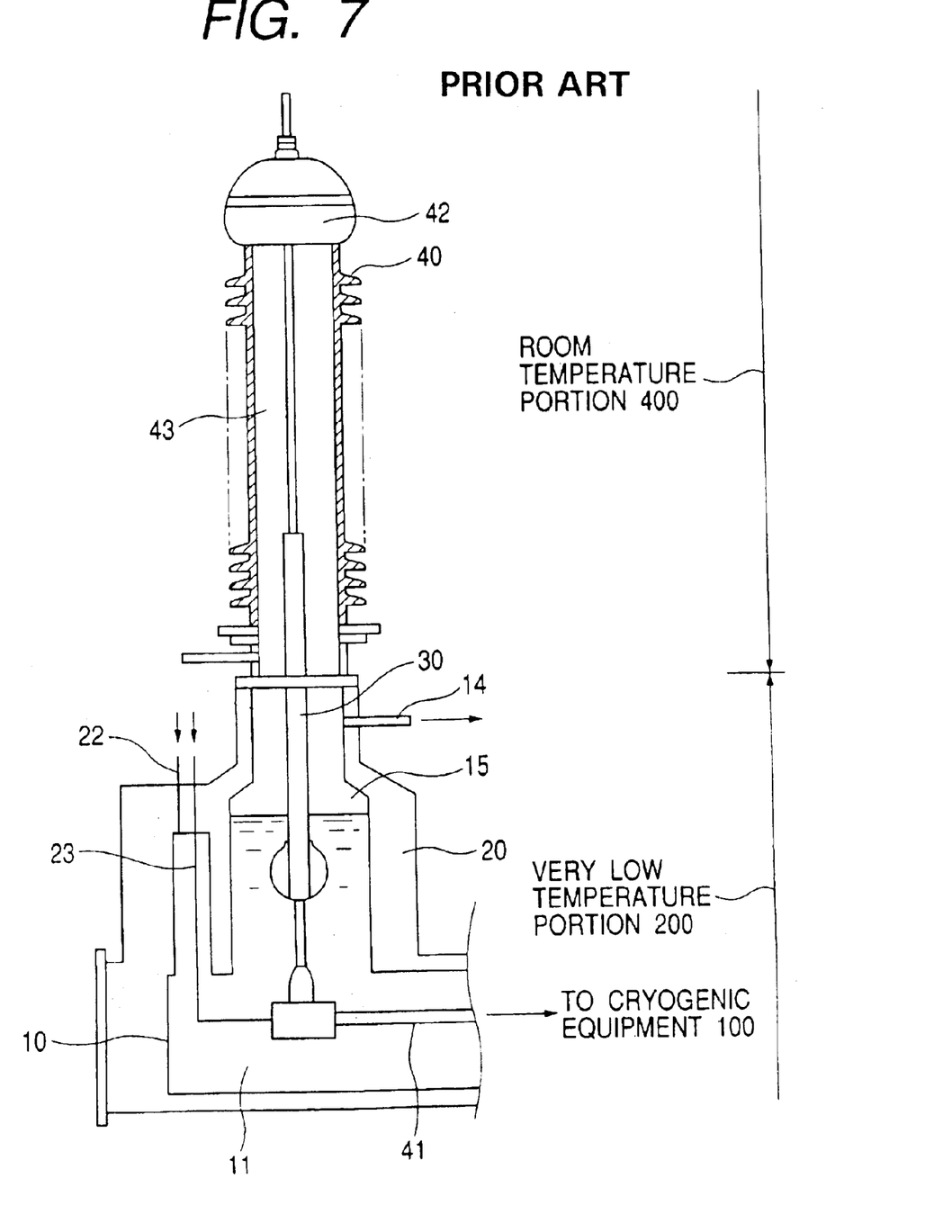
FIG. 7 is a schematic view showing a conventional terminal structure.

FIG. 7 is a schematic view showing a conventional terminal structure for cryogenic equipment.

This terminal structure has a terminal of cryogenic equipment 100 (not shown), a refrigerant tank 10 for receiving the terminal, a bushing 30 for securing electric conduction from a conductor of the vacuum vessel 20 to a room temperature portion, a vacuum vessel 20 covering the outside of the refrigerant tank 10, and an insulator 40 connected to an upper portion of the vacuum vessel 20 so as to protrude therefrom.

The bushing 30 is connected, substantially at right angles, to a superconductor led in from the cryogenic equipment 100. The bushing 30 has a conductor in its core, and is circumferentially coated with solid insulation such as ethylene-propylene rubber or the like. The bushing 30 penetrates the joint surface between the vacuum vessel 20 and the insulator 40 so as to be received in the insulator 40. The inside of the insulator 40 is filled with insulating fluid 43 such as insulating oil, sulfur hexafluoride $SF_6$, or the like.

Liquid nitrogen 11 supplied from a supply pipe 22 is accumulated in the refrigerant tank, while a nitrogen gas reservoir 15 is formed above the liquid nitrogen 11. This nitrogen gas can be discharged through a gas discharge port 14.

Thus, in such a terminal structure, the conduction portion from the cryogenic equipment 100 to the insulator 40 passes the very low temperature portion immersed in the liquid nitrogen 11, the nitrogen gas reservoir 15 and the room temperature portion in the insulator, in the order of increasing distance from a cable 80.

However, the aforementioned terminal structure has the following problems.

(1) Thermal invasion from the room temperature portion 400 to the very low temperature portion 200 is large.

When the nitrogen gas reservoir 15 exists between the liquid level of the liquid nitrogen 11 and the upper surface of the vacuum vessel 20, heat conduction occurs from the vacuum vessel 20 to the room temperature portion 400 due to the convection of the nitrogen gas. The temperature of the liquid nitrogen increases in accordance with the heat conduction. As a countermeasure against the temperature increase, cooling is carried out correspondingly to the temperature increase. As a result, the energy required for the cooling becomes a loss to thereby cause increase in the system loss as a whole.

(2) Application of regenerative cooling using a closed system to the refrigerant tank is difficult.

A part of the bushing 30 is usually immersed in a refrigerant. The liquid level of the liquid nitrogen 11 is controlled so as to be maintained at a level required for this immersion. When the refrigerant tank is an open system, the liquid level can be maintained by supplying the liquid nitrogen 11. However, when regenerative cooling is carried out with the supply pipe 22 and the discharge port 14 being closed to leave the liquid nitrogen 11 as it is, a change in pressure, a change in invading heat, and so on, make control of the liquid level be difficult.

On the other hand, the bushing 30 is connected, substantially at right angles, to the connecting cable (conductor) 80 connected to the superconductor of the cryogenic equipment 100. The bushing 30 is, for example, formed by inserting a conductor of copper or the like into the core of a stainless steel pipe, and coating the circumference of the stainless steel pipe with solid insulation such as ethylene-propylene rubber or the like. One end of the bushing 30 is immersed in the refrigerant while the other end thereof penetrates the joint surface between the vacuum vessel 20 and the insulator 40 so as to be received in the insulator 40. The inside of the insulator 40 is filled with insulating fluid 43 such as insulating oil, $SF_6$ or the like. When the insulator 40 is filled with insulating oil, a gas reservoir may be formed above the insulating oil. In the inside of the stainless steel pipe, there is a space connecting very low temperature with room temperature. This space may communicate with the aforementioned gas reservoir or may not communicate with the aforementioned gas reservoir.

The liquid nitrogen 11 supplied from the supply pipe 22 is accumulated in the refrigerant tank 10, and a nitrogen gas reservoir portion 13 is formed above the liquid nitrogen 11. This nitrogen gas can be discharged through the gas discharge port 14.

Thus, in such a terminal structure, the conduction portion from the cryogenic equipment 100 to the insulator 40 passes the very low temperature portion 200 immersed in the liquid nitrogen 11, the nitrogen gas reservoir portion 13, and the room temperature portion 400 in the insulator 40, in the order of increasing distance from the cable.

However, the aforementioned terminal structure further has the following problems.

(3) When the space inside the bushing 30 communicates with the gas reservoir 42 in the insulator 40, the insulation performance may deteriorate.

If the air exists in the space which is formed in the housing 30 for connecting the very low temperature to the room temperature, liquefaction and freeze occurs in the air due to the very low temperature so that the volume of the air is reduced greatly. As a result, the inside of the insulator 40 becomes negative pressure, resulting in deterioration of insulation performance.

It can be also considered that a gas supply unit is connected so that gas supply can follow the volume change of gas in the space of the bushing 30. However, since a gas inlet 22 becomes a high voltage portion, shutdown of current application and attachment/detachment of pipe arrangement are required for the connection of the gas supply unit in an unrealistic sense.

It can be also considered that gas is not supplied to the space of the bushing 30, but the space in the bushing 30 and the gas reservoir 42 in the insulator 40 are kept at high pressure in advance so as to prevent the insulation performance from being affected by the lowering of pressure caused by cooling. However, in order to secure pressure large enough not to affect the insulation performance after cooling, the pressure before cooling should be excessive in an unrealistic sense.

(4) When the space inside the bushing 30 does not communicate with the gas reservoir 42 in the insulator 40, mechanical damage may be caused by an excessive pressure change in the inside of the bushing.

In the configuration in which the space inside the bushing 30 does not communicate with the gas reservoir 42 in the insulator 40, the space inside the bushing 30 is generally sealed off. Therefore, the aforementioned deterioration of the insulation performance caused by the negative pressure is insignificant. However, it is also anticipated that the sealing of the space inside the bushing 30 is not perfect. In that case, there is a possibility that the space communicates with the gas reservoir 42, though slightly. From a long-term perspective, it can be considered that the gas in the space of the bushing 30 is liquefied to form negative pressure so that the air of the gas reservoir 42 is sucked into the inside of the bushing 30 gradually due to the state of negative pressure. Then, when the air sucked from the gas reservoir into the space inside the bushing 30 is liquefied, very high pressure is formed when the air returns to the room temperature. Thus, the very large pressure causes mechanical damage to the bushing 30.

DISCLOSURE OF THE INVENTION

It is a first object of the present invention to provide a terminal structure of cryogenic equipment superior in adiathermancy.

In addition, it is a second object of the present invention to provide a terminal structure of cryogenic equipment in which any liquefied substance is prevented from occurring in the inside of a conductor portion such as a bushing or the like, so that the lowering of insulation performance and an excessive pressure change in the inside of the conductor portion both generated with the occurrence of the liquefied substance can be suppressed.

The aforementioned objects are attained by providing a connecting/heat-insulating portion adiabatically connected between a very low temperature portion and a room temperature portion.

That is, the terminal structure according to the present invention is a terminal structure of cryogenic equipment for leading a terminal of the cryogenic equipment from a very low temperature portion to a room temperature portion through a bushing. The terminal structure has a feature in that a connecting/heat-insulating portion is provided along the outer circumference of the aforementioned bushing between the aforementioned very low temperature portion and the aforementioned room temperature portion so as to be connected adiabatically with the aforementioned very low temperature portion and the aforementioned room temperature portion.

Since the connecting/heat-insulating portion connected adiabatically is interposed between the very low temperature portion and the room temperature portion, the heat conduction between the very low temperature portion and the room temperature portion caused by the convection of nitrogen gas, as a problem in a conventional nitrogen gas portion, is avoided so that high adiathermancy can be attained. In accordance with this high adiathermancy, it is possible to easily realize regenerative cooling in a closed system.

Preferably, the aforementioned connecting/heat-insulating portion is formed between a very-low-temperature-side flange for thermally sealing the very low temperature portion and a room-temperature-side flange for thermally sealing the room temperature portion. These two flanges are connected to the outer circumference of the aforementioned bushing so as to protrude therefrom.

On that occasion, preferably, one of the flanges is fixed to a vacuum vessel or a refrigerant tank while the other flange is designed to be movable. Thus, the flange is made movable in accordance with the thermal expansion and contraction of the bushing so as to prevent excessive stress from being imposed on any flange. Typically, it is preferable that the very-low-temperature-side flange is fixed while the room-temperature-side flange is made movable.

In addition, it is preferable that the connecting/heat-insulating portion has a double structure of an inner layer portion and an outer layer portion sectioned from each other. On that occasion, a vacuum may be created in both the inner layer portion and the outer layer portion, or only the inner layer portion may be filled with gas.

When a vacuum is created in both the inner and outer layer portions, the pressure in the very low temperature portion filled with the refrigerant becomes higher. It may be therefore considered that the refrigerant in the very low temperature portion leaks into the connecting/heat-insulating portion. Even in that case, only a limited section of the inner layer portion is filled with the refrigerant while heat insulation between the very low temperature portion and the room temperature portion is secured by the vacuum in the outer layer portion. It is therefore possible to keep the lowering of adiathermancy to a minimum. Accordingly, it is preferable that the inner layer portion is formed as a small space.

On the other hand, when gas is charged into only the inner layer portion, preferably, the gas has a lower boiling point than that of the refrigerant in the very low temperature portion, and the pressure of the gas is substantially equal to the refrigerant pressure in the very low temperature portion. When the pressure in the inner layer portion is made equal to that in the very low temperature portion, it is possible to prevent the refrigerant from leaking from the very low temperature portion into the inner layer portion. In addition, when the boiling point of the gas is made lower than the boiling point of the refrigerant in the very low temperature portion, the gas is prevented from being liquefied or solidified even if the refrigerant leaks into the inner layer portion. When the refrigerant in the very low temperature portion is selected to be liquid nitrogen, preferably, the gas charged into the inner layer portion is helium He or the like.

In addition, when means for detecting the pressure in the inner layer portion is provided, the pressure increase of the inner layer portion caused by the leakage of the refrigerant from the very low temperature portion can be detected so that the leakage of the refrigerant can be monitored.

Preferably, the flanges are formed out of materials that can be bonded with the bushing. For example, the chief material of the bushing is fiber reinforced plastic (FRP) while the chief material of the flanges is plastic (such as epoxy resin or the like) that can be bonded to the fiber reinforced plastic.

Examples of the cryogenic equipment to which the terminal structure according to the present invention is applied include superconducting cables, superconducting magnetic energy storage (SMES) systems, superconducting current limiters, and the like. Particularly, the terminal structure according to the present invention is optimal for a terminal structure of a superconducting cable requiring regenerative cooling in a closed system for carrying out long-distance cooling.

Further, the bushing used herein may have a conductor portion led from the aforementioned very low temperature portion to the room temperature portion, and an outer circumferential gas phase space connecting the very low temperature portion with the room temperature portion along the outer circumference of the aforementioned conductor portion.

Desirably, this outer circumferential gas phase space is filled with gas not liquefied at a very low temperature.

In addition, desirably, the aforementioned gas is helium or the like.

Furthermore, a vacuum may be created in this outer circumferential gas phase space.

In addition, according to a second aspect of the present invention, gas charged into an internal space is limited in the longitudinal direction of a conductor portion, or a vacuum is created in the space. In this manner, the pressure is kept constant so as to prevent covering of the conductor portion from being damaged and failure in electric continuity from being caused. Thus, the aforementioned second object is attained.

According to the second aspect of the present invention, there is provided a terminal structure of cryogenic equipment having a conductor portion led from a very low temperature portion to a room temperature portion, having a feature in that the aforementioned conductor portion is covered to have a gas phase space in an area connecting the very low temperature portion with the room temperature portion.

Preferably, the terminal structure has features in that the conductor portion is covered to have a gas phase space in an area connecting the very low temperature portion with the room temperature portion, and this space is filled with gas not liquefied at a very low temperature.

A specific example of the gas used in this case includes helium.

In addition, preferably, the terminal structure is a terminal structure of cryogenic equipment having a conductor portion led from a very low temperature portion to a room temperature portion, having features in that the aforementioned conductor portion is covered to have a gas phase space connecting the very low temperature portion with the room temperature portion, and this space is maintained in a vacuum.

When the conductor portion is covered to have a gas phase space in an area connecting the very low temperature portion with the room temperature portion, and when this gas phase space is filled with gas not liquefied at a very low temperature or a vacuum is created in this gas phase space, any liquefied substance is restrained from occurring in the space even at the very low temperature. Thus, the lowering of insulation performance and an excessive pressure change in the inside of the conductor portion both generated with the pressure reduction in the conductor portion can be suppressed.

More specific configurations of the respective parts of the terminal structure according to the present invention will be described.

The conductor portion may be either a conductor portion having a hollow pipe or a conductor portion in which a conductive current lead of copper or the like has been inserted into a hollow pipe. The conductor portion is formed a space connecting the very low temperature portion with the room temperature portion is formed inside the conductor portion. Typically, solid insulation of rubber, epoxy resin or the like is applied to the outer circumference of a hollow pipe. The insulated current lead may be formed into a rod, a pipe, a stranded wire, or the like.

The very low temperature portion is not limited particularly if the very low temperature portion has a structure in which the very low temperature portion is kept in the condition of very low temperature by a refrigerant such as liquid nitrogen or the like. A typical configuration thereof is a configuration having a refrigerant tank for storing the refrigerant and a vacuum vessel for maintaining a vacuum in the outer circumference of the refrigerant tank.

The room temperature portion may be configured so that the conductor portion penetrates almost the center of an insulating jacket such as an insulator, an epoxy bushing, or the like, and insulating fluid is charged into a space between the insulating jacket and the conductor portion. As the insulating fluid, liquid such as insulating oil or the like or gas such as $SF_6$ or the like can be used. Typically, when insulating oil is used, an insulating oil reservoir and an air gap portion formed above the insulating oil reservoir are provided inside the insulating jacket.

When this air gap portion communicates with the space in the conductor portion, the space in the conductor portion and the aforementioned air gap portion are filled with gas not liquefied at a very low temperature. Consequently, any liquefied substance is prevented from occurring in the conductor portion at the very low temperature. Thus, the insulation performance is prevented from being lowered due to negative pressure in the conductor portion and the air gap portion.

When the air gap portion formed above the insulating oil reservoir does not communicate with the space in the conductor portion, a vacuum may be created in the space in the conductor portion or the space in the conductor portion may be filled with gas not liquefied at a very low temperature. This configuration may be attained by sealing the space in the conductor portion by welding or the like. Accordingly, any liquefied substance is prevented from occurring in the conductor portion at the very low temperature. Thus, an excessive pressure change in the bushing is suppressed so that the bushing is prevented from being mechanically damaged.

Examples of the cryogenic equipment to which the terminal structure according to the present invention is applied include superconducting cables, superconducting magnetic energy storage (SMES) systems, superconducting current limiters, and the like. Particularly, the terminal structure according to the present invention is optimal for a terminal structure of a superconducting cable requiring regenerative cooling in a closed system for carrying out long-distance cooling.

In the drawings, parts are designated by reference numerals as follows.

10 refrigerant tank, 11 liquid nitrogen, 13 lower shield, 14 gas discharge port, 15 nitrogen gas reservoir, 100 cryogenic equipment, 20 vacuum vessel, 30 bushing, 31 body, 32 very-low-temperature-side flange, 33 room-temperature-side flange, 34 upper shield, 71 inner layer portion, 72 outer layer portion, 73A, 73B flexible pipe, 40 insulator, 41 silicon oil, 42 gas reservoir, 43 insulating fluid, 110 refrigerant tank, 111 liquid nitrogen, 112 liquid nitrogen portion, 113 nitrogen gas reservoir portion, 120 vacuum vessel, 130 bushing, 131 stainless steel pipe, 132 solid insulating layer, 133 current lead, 134 space, 135 very-low-temperature-side flange, 136 room-temperature-side flange, 137 flange, 140 insulator, 141 insulating oil reservoir, 142 air gap portion, 143 $SF_6$ gas, 150 flexible pipe, 22,23 supply pipe, 80 connecting conductor, 100 cryogenic equipment, 200 very low temperature portion, 300 connecting/heat-insulating portion, and 400 room temperature portion.

BEST MODE FOR CARRYING OUT THE INVENTION

Embodiments of the present invention will be described below.

(First Embodiment)

Figures 1A, 1B:
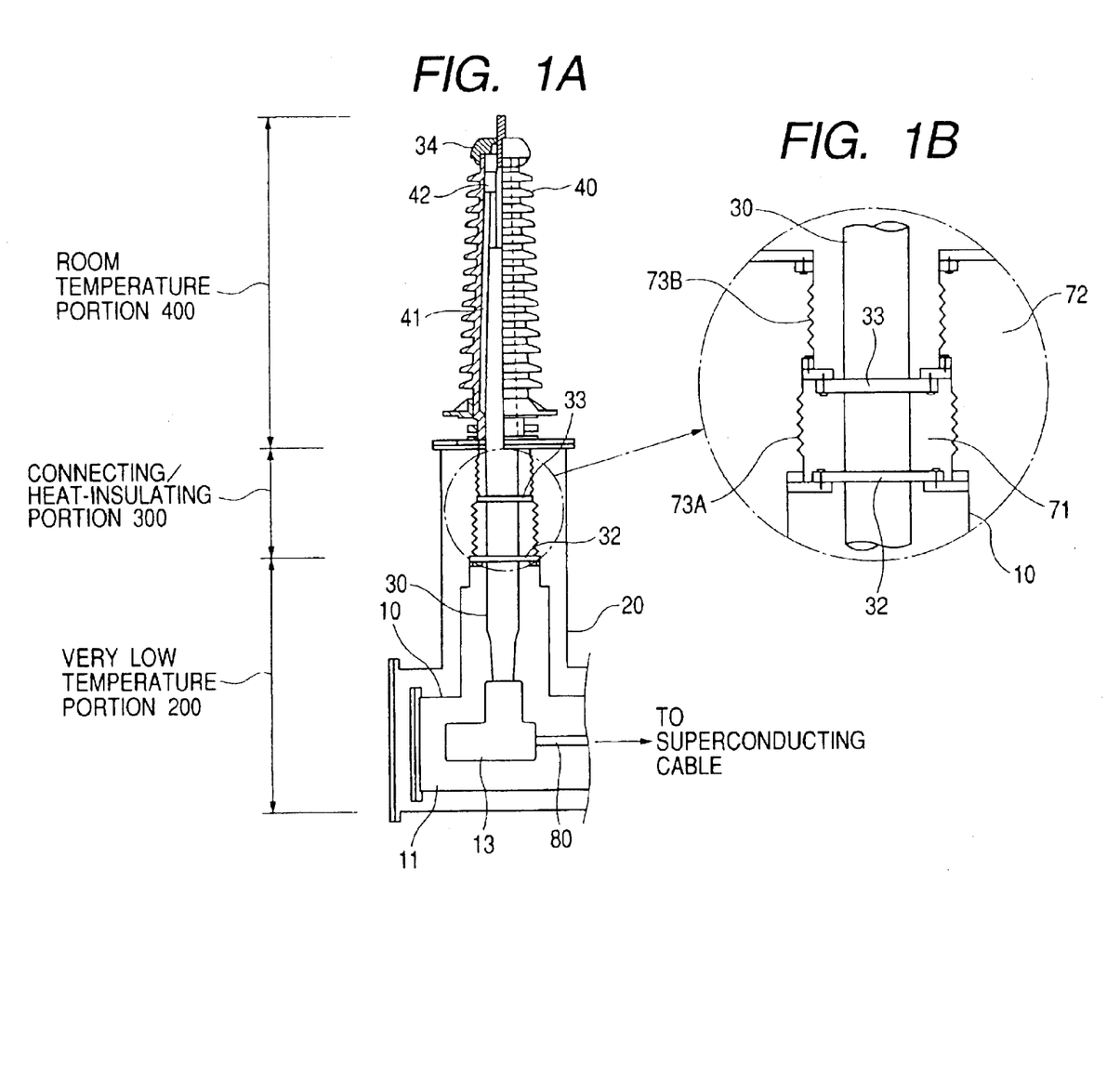
FIGS. 1A and 1B are schematic views of a terminal structure according to a first embodiment of the present invention.

Here, a terminal structure of a superconducting cable will be described by way of example. FIG. 1A is a schematic view of a terminal structure according to the present invention, and FIG. 1B is a blow-up view of a portion of the terminal structure shown in FIG. 1A. This terminal structure has a very low temperature portion immersed in liquid nitrogen 11 in a refrigerant tank 10, a room temperature portion 400 received in an insulator 40, and a connecting/heat-insulating portion 300 formed between the very low temperature portion 200 and the room temperature portion 400.

The vacuum vessel 20 is connected to an adiabatic pipe (not shown) of a superconducting cable. A vacuum is maintained in the vacuum vessel 20, in the portion connecting with the adiabatic pipe and in the adiabatic pipe. In this embodiment, the opening diameter of the vacuum vessel 20 was set at φ600 mm.

A connecting conductor 80 connecting with the conductor of the superconducting cable (not shown) is introduced into the refrigerant tank 10. The refrigerant tank 10 is a cylindrical pipe in which the liquid nitrogen 11 is enclosed hermetically. The diameter of the cylindrical pipe was set at φ400 mm on both the bushing side and the cable side.

In this refrigerant tank 10, the connecting conductor 80 is connected to an end portion of the bushing 30 substantially at right angles. This connecting portion is received in a lower shield 13.

The bushing 30 is a rod-like body having FRP and foil electrodes laminated to the outer circumference of a stainless steel pipe, and having its opposite ends tapered. The lamination of FRP and foil electrodes is so-called capacitor-type electric-field relaxation means. The tapered structure and capacitor-type electric-field relaxation means is an example of the bushing and does not limit the configuration of the present invention. The bushing may have a straight pipe structure, or stress cone type electric-field relaxation means may be used.

Figure 2:
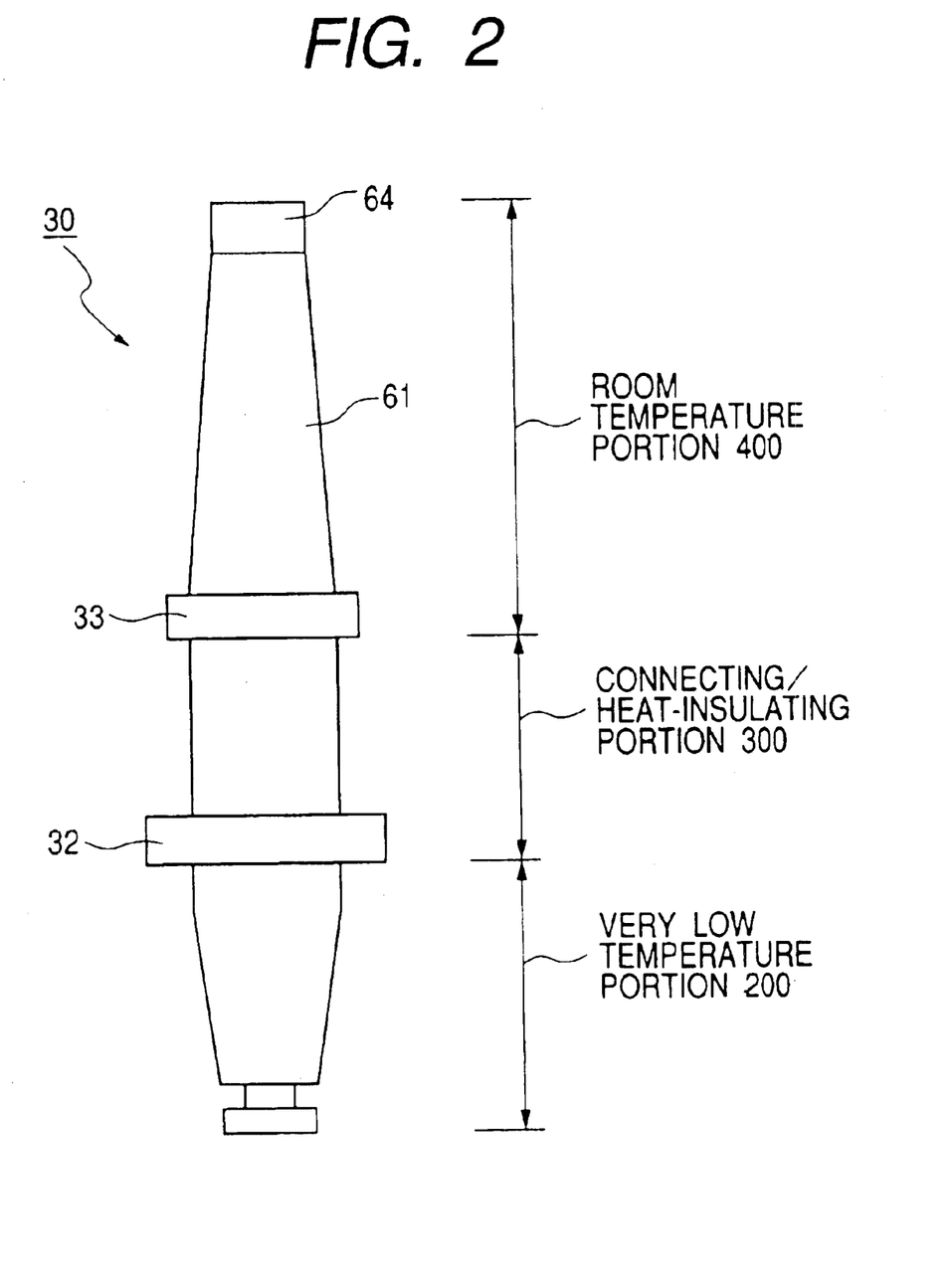
FIG. 2 is a side view showing an example of a bushing for use in the terminal structure according to the first embodiment of the present invention.

FIG. 2 shows an example of the bushing 30. A pair of flanges 32 and 33 are integrated with the outer circumference of a bushing body 31. The lower flange is a very-low-temperature-side flange 32, and the upper flange is a room-temperature-side flange 33.

Flanges easy to bond with the material of the outer circumference of the body are selected as the flanges 32 and 33 so as to be fit to the body 31 by screwing and integrated therewith by bonding. Here, the very-low-temperature-side flange 32 was made of FRP, and the room-temperature-side flange 33 was made of stainless steel. An upper shield 34 made of copper or aluminum is formed at the upper end of the bushing 30.

The upper end of the vacuum vessel 20 is sealed with the room-temperature-side flange 33 configured thus, and further the upper end of the refrigerant tank 10 is sealed with the very-low-temperature-side flange 32. Thus, a space formed between the very-low-temperature-side flange 32 and the room-temperature-side flange 33 is set as a connecting/heat-insulating portion 300 (FIG. 1A).

Here, the room-temperature-side flange 33 is designed to be movable by use of corrugated flexible pipes 73A and 73B. Thus, the room-temperature-side flange 33 is made movable in accordance with the thermal expansion and contraction of the bushing 30 so as to prevent excessive stress from being imposed on the very-low-temperature-side flange 32.

For example, the very-low-temperature-side flange 32 is fixed to the upper end of the refrigerant tank 10, and the lower end of the flexible pipe 73A surrounding the same flange 32 is fixed to the upper end of the refrigerant tank 10. The upper end of the flexible pipe 73A is fixed to the room-temperature-side flange 33, and further the lower end of the flexible pipe 73B is coupled with the upper end of the flexible pipe 73A. Then, the upper end of the flexible pipe 73B is fixed to the upper end of the vacuum vessel 20.

In this configuration, the connecting/heat-insulating portion is divided into an inner layer portion 71 and an outer layer portion 72 by the flexible pipe 73A. The inner layer portion 71 is a small space surrounded by the outer layer portion 72.

The refrigerant tank 10 stores the liquid nitrogen 11, which is compressed and circulated. Thus, the refrigerant tank 10 has higher pressure than that in the space in which a vacuum between the refrigerant tank 10 and the vacuum vessel 2 is maintained. Therefore, when the connecting/heat-insulating portion is designed to have a double structure of the inner layer portion 71 and the outer layer portion 72, the adiathermancy of the terminal structure as a whole is kept sufficient for the following reason. That is, even if the refrigerant leaks from the refrigerant tank 10, the leaking refrigerant stays in the inner layer portion 71. Thus, the heat insulation performance of the inner layer portion 71 deteriorates merely, but the vacuum in the outer layer portion 72 is maintained.

Here, if means for detecting the pressure of the inner layer portion 71 is provided to monitor the pressure change of the inner layer portion 71, it is also possible to detect the leakage of the refrigerant from the refrigerant tank 10 based on the increase of the pressure.

Further, as an alternative to creation of a vacuum in the inner layer portion 71, the inner layer portion 71 may be filled with gas. The pressure of the gas at that time is set to be substantially equal to the pressure of the liquid nitrogen in the refrigerant tank 10. Consequently, the pressure in the refrigerant tank is kept equal to the pressure in the inner layer portion so that the refrigerant can be restrained from leaking out of the refrigerant tank 10. Gas lower in boiling point than nitrogen which is the refrigerant, for example, helium is selected to be the gas to be used. Even if the refrigerant leaks into the inner layer portion 71, the gas is not liquefied or solidified by the temperature of the refrigerant.

Although the above description has been made on the connecting/heat-insulating portion having a double structure, the flexible pipe 73A may be removed from FIG. 1 so as to form a single-layer connecting/heat-insulating portion. Also in this case, since the room-temperature-side flange 33 is coupled with the flexible pipe 73B, the room-temperature-side flange 33 can be made movable in accordance with the thermal expansion and contraction of the bushing.

Then, as shown in FIG. 1A, in the insulator 40, silicon oil 41 was charged into the space between the insulator 40 and the bushing 30 in order to improve the electrical surface strength of the outer surface of the bushing and the inner surface of the insulator. In addition, a gas reservoir 42 was provided above the silicon oil 41 so as to deal with the volume change caused by the temperature change of the silicon oil. In consideration of the liquefaction of the gas when the liquid nitrogen was charged into the terminal structure, He gas which was not liquefied at the liquid nitrogen temperature was used as the gas of the gas reservoir 42.

When such a connecting/heat-insulating portion is provided, the adiathermancy between the very low temperature portion and the room temperature portion can be enhanced so that it is possible to realize a terminal structure of cryogenic equipment very excellent in adiathermancy. In addition, it is possible to arrange a terminal structure of a closed system in which the refrigerant tank is sealed while regenerative cooling is attained without resupplying the refrigerant.

As described above, according to the present invention, a connecting/heat-insulating portion is formed between a very low temperature portion and a room temperature portion in a terminal structure of cryogenic equipment. Thus, high heat resistance can be attained so that regenerative cooling using a closed system can be carried out in a system without resupplying a refrigerant.

(Second Embodiment)

Figure 3:
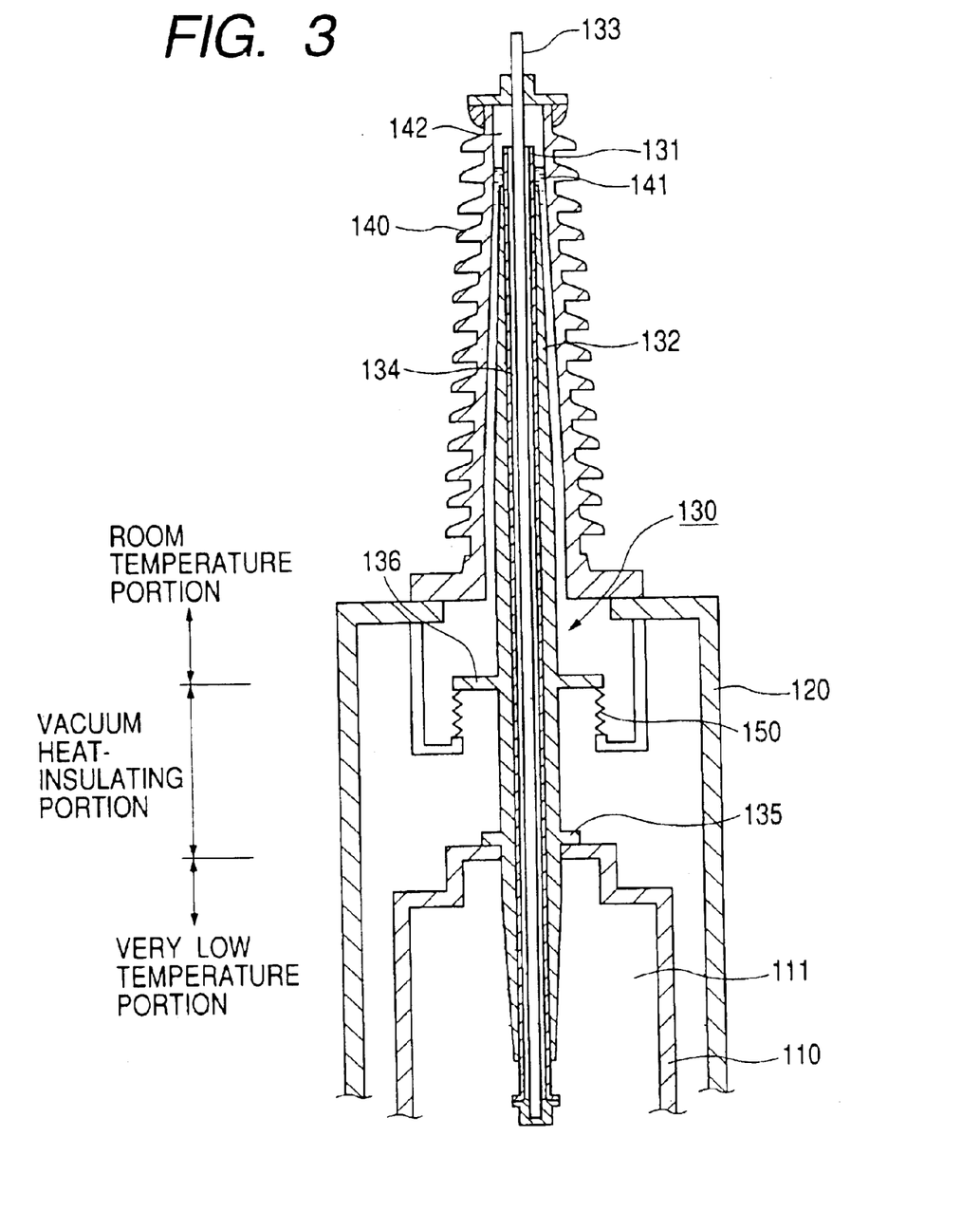
FIG. 3 is a schematic sectional view of a terminal structure according to a second embodiment of the present invention.

Here, a terminal structure of a superconducting cable will described by way of example. FIG. 3 is a schematic view of a terminal structure according to the present invention. This terminal structure has a very low temperature portion 200 immersed in liquid nitrogen 111 in a refrigerant tank 110, a room temperature portion 400 received in an insulator 140, and a connecting/heat-insulating portion 300 formed between the very low temperature portion and the room temperature portion.

A connecting conductor connecting with the conductor of a not-shown superconducting cable is introduced, through a vacuum vessel 120, into the refrigerant tank 110 constituting the very low temperature portion 200. The refrigerant tank 110 is a cylindrical pipe in which the liquid nitrogen 111 is enclosed hermetically. The aforementioned connecting conductor is connected to a bushing 130 (conductor portion) in the refrigerant tank.

The refrigerant tank 100 configured thus is received in the vacuum vessel 120. The vacuum vessel 120 is designed so that a predetermined vacuum state can be maintained in the vacuum vessel 120. A not-shown lower end portion of the vacuum vessel 120 is connected to an adiabatic pipe (not shown) of the superconducting cable. A vacuum is also maintained both in the portion connecting the vacuum vessel with the adiabatic pipe and in the adiabatic pipe.

On the other hand, the insulator 140 is fixed to the upper portion of the vacuum vessel 120 so as to form the room temperature portion. The insulator 140 receives, in its inside, the bushing 130 which will be described later. The insulator 140 is also provided with an insulating oil reservoir 141 in which insulating oil is charged between the insulator inside and the bushing 130, and an air gap portion 142 formed above the insulating oil reservoir 141. Here, oil such as silicon alkyl benzene, polybutene or the like is used as the insulating oil.

The bushing 130 is formed in the same manner as that described in the aforementioned first embodiment. One end of the bushing is immersed in the liquid nitrogen 111 while the other end thereof is introduced into the insulator 140. A lamination of FRP and foil electrodes is so-called capacitor-type electric-field relaxation means. A copper pipe to be a current lead 133 is inserted into the inside of a stainless pipe 131. The tapered structure and capacitor-type electric-field relaxation means is an example of the bushing and does not limit the configuration of the present invention. The bushing may have a straight pipe structure, or stress cone type electric-field relaxation means may be used.

A space 134 connecting the very low temperature portion with the room temperature portion is formed in the stainless pipe 131. This space 134 communicates with the air gap portion 142 above the insulating oil reservoir. Helium gas not liquefied at the very low temperature is charged into the space 134. Typically, the very low temperature means the temperature of the refrigerant used. Generally, a refrigerant having a higher boiling point than that of helium, for example, liquid nitrogen is preferable as the refrigerant. The boiling point of $N_2$ is 77.3 K at the atmospheric pressure. With such a configuration, any liquefied substance is prevented from occurring at the very low temperature in the inside of the bushing, so that the insulation performance is prevented from being lowered due to the negative pressure in the space and in the air gap portion.

On the other hand, a pair of flanges 135 and 136 are integrated with the outer circumference of the bushing 130. The lower flange is a very-low-temperature-side flange 135, and the upper flange is a room-temperature-side flange 136.

Flanges easy to bond with the material of the outer circumference of a solid insulating layer 132 are selected as the flanges 135 and 136 so as to be fit to the solid insulating layer by screwing and integrated therewith by bonding. Here, the very-low-temperature-side flange 135 was made of FRP, and the room-temperature-side flange 136 was made of stainless steel.

The upper end of the vacuum vessel 120 is sealed with the room-temperature-side flange 136 configured thus, and further the upper end of the refrigerant tank 110 is sealed with the very-low-temperature-side flange 135. Thus, a space formed between the very-low-temperature-side flange 135 and the room-temperature-side flange 136 is set as a connecting/heat-insulating portion.

Here, the room-temperature-side flange 136 is designed to be movable by use of a corrugated flexible pipe 150. Thus, the room-temperature-side flange 136 is made movable in accordance with the thermal expansion and contraction of the bushing 130 so as to prevent excessive stress from being imposed on the very-low-temperature-side flange 135.

For example, the very-low-temperature-side flange 135 is fixed to the upper end of the refrigerant tank 110. The upper end of the flexible pipe 150 is fixed to the room-temperature-side flange 136, and further, the lower end of the flexible pipe 150 is coupled with the upper end of the vacuum vessel 120.

When such a connecting/heat-insulating portion 300 is provided, the adiathermancy between the very low temperature portion 200 and the room temperature portion 400 can be enhanced so that it is possible to realize a terminal structure of cryogenic equipment 100 very excellent in adiathermancy. In addition, it is possible to arrange a terminal structure of a closed system in which the refrigerant tank 110 is sealed while regenerative cooling is attained without resupplying the refrigerant 111.

(Third Embodiment)

Figure 4:
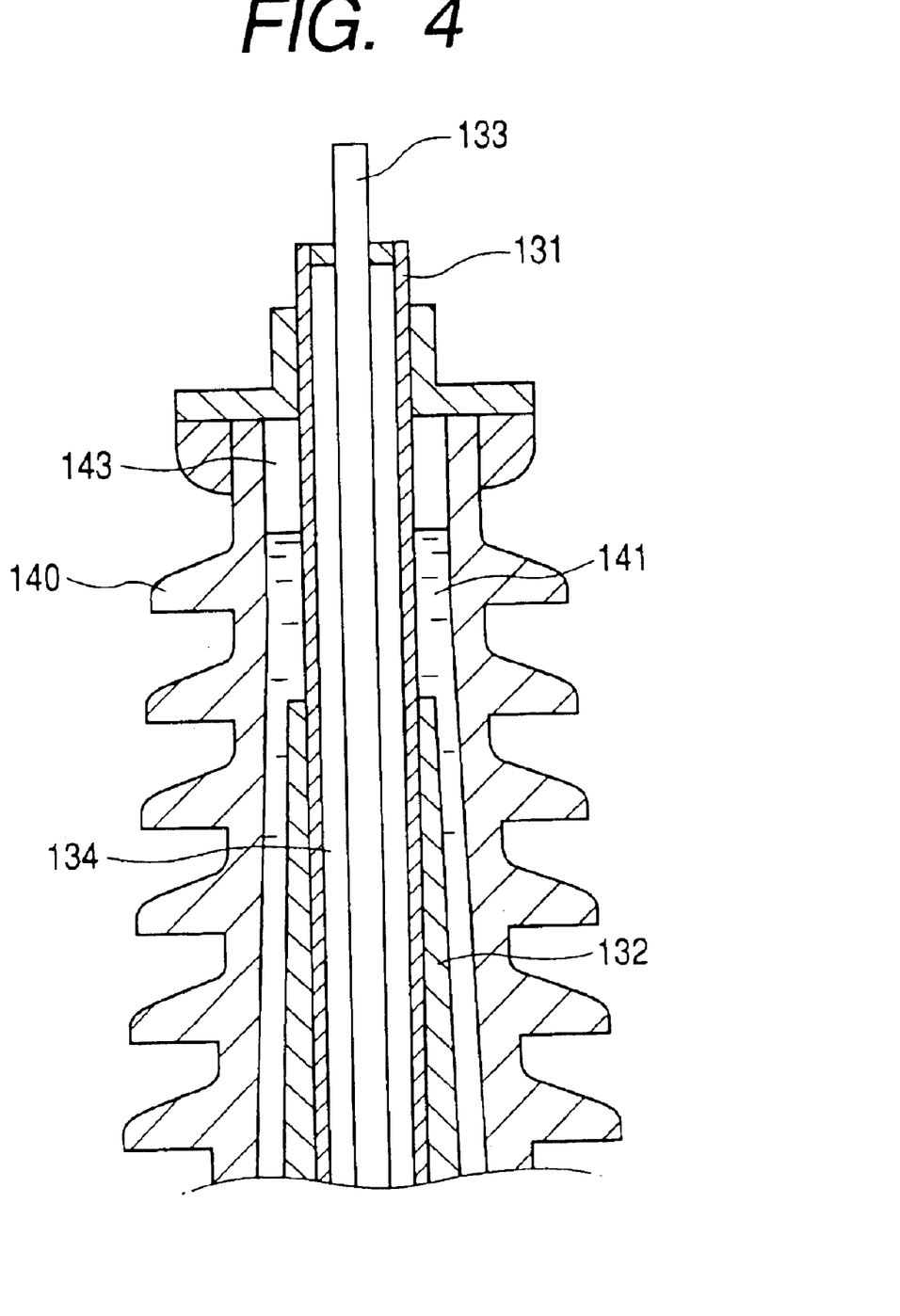
FIG. 4 is a partial sectional view of a room temperature portion in a terminal structure according to a third embodiment of the present invention.

Next, FIG. 4 shows an embodiment having a different configuration in its room temperature portion. The third embodiment has the same configuration as that of the first embodiment, except that the configuration of an end portion of the room temperature portion is different. Therefore, description will be made chiefly on the different point.

This room temperature portion has a configuration in which a bushing 130 is received in an insulator, but a space 134 formed inside the bushing 130 does not communicate with an air gap portion 142 formed above an insulating oil reservoir. In this case, a vacuum is created in the space inside the bushing or the space inside the bushing is filled with helium gas not liquefied at the very low temperature. The space inside the bushing is sealed by welding the end portions of a stainless steel pipe 131, or the like. With such a configuration, any liquefied substance is restrained from occurring inside the bushing so as to suppress an excessive pressure change in the bushing. Thus, the bushing is prevented from being mechanically damaged.

(Fourth Embodiment)

Figure 5:
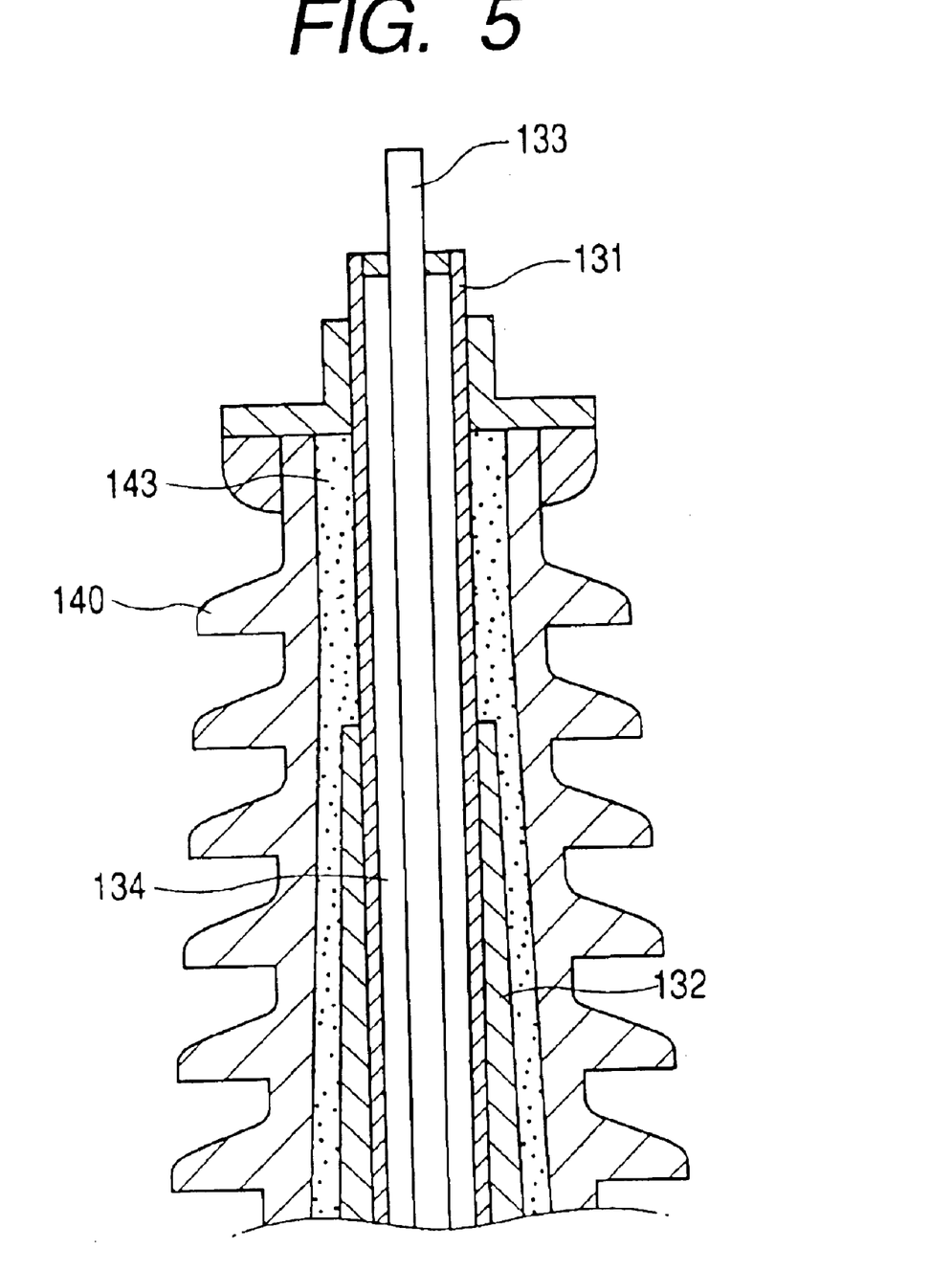
FIG. 5 is a partial sectional view of a room temperature portion in a terminal structure according to a fourth embodiment of the present invention.

Next, FIG. 5 shows an embodiment in which $SF_6$ gas 143 is selected to be the insulating fluid in the room temperature portion. The configuration of the fourth embodiment is the same as that of the second embodiment, except that the configuration of an end portion of the room temperature portion is different. Therefore, description will be made chiefly on the different point.

This room temperature portion also has a configuration in which a bushing 130 is received in an insulator, but a space 134 formed inside the bushing does not communicate with a space filled with the $SF_6$ gas 143. Although insulating oil was used as the insulating fluid in the third embodiment, the $SF_6$ gas 143 is used in place of the insulating oil in this embodiment. Also in this case, a vacuum is created in the space inside the bushing or the space inside the bushing is filled with helium gas not liquefied at the very low temperature. The space inside the bushing is sealed by welding the end portions of a stainless steel pipe 131, or the like. With such a configuration, any liquefied substance is restrained from occurring inside the bushing so as to suppress an excessive pressure change in the bushing. Thus, the bushing is prevented from being mechanically damaged.

(Fifth Embodiment)

Figure 6:
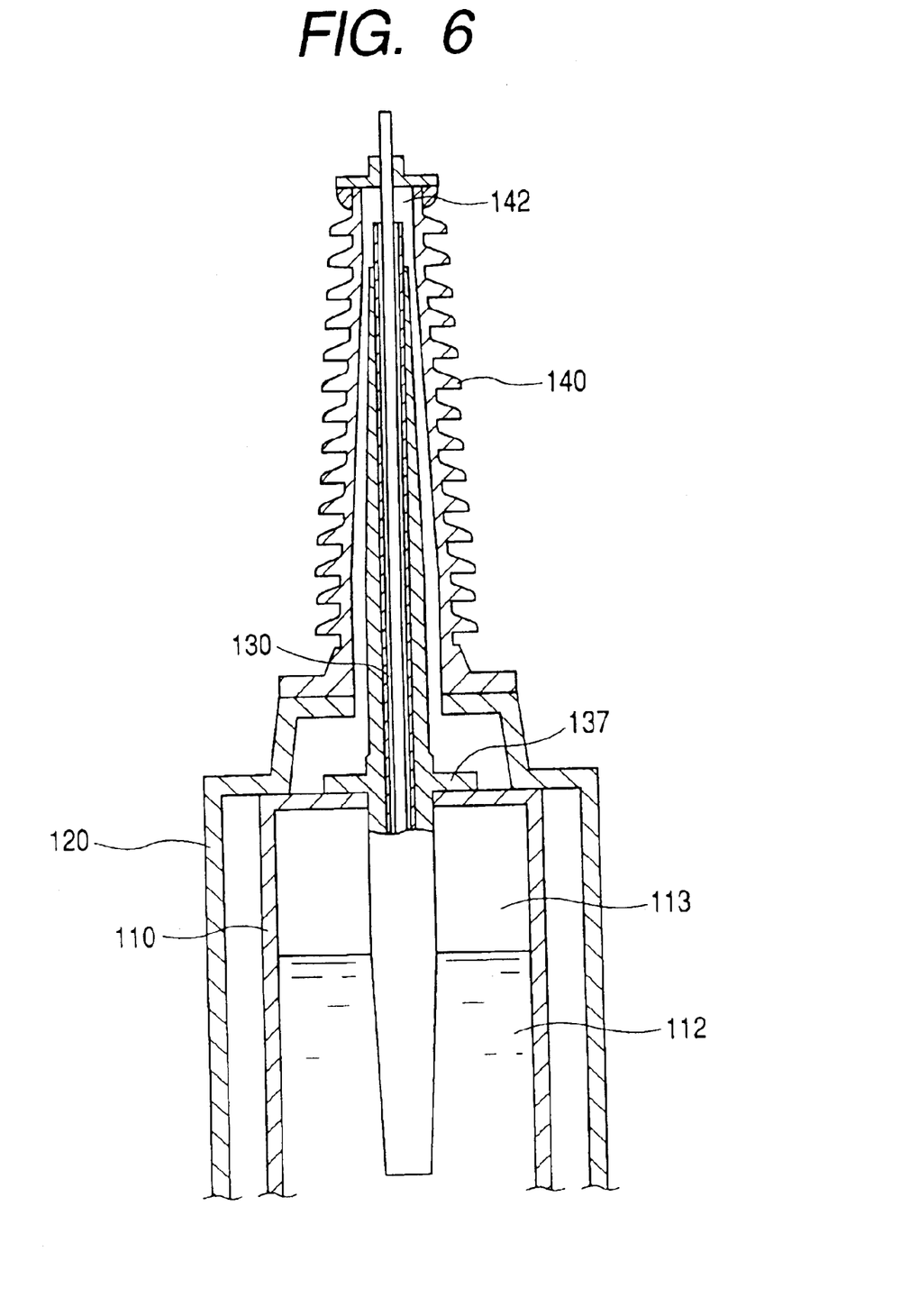
FIG. 6 is a schematic sectional view of a room temperature portion in a terminal structure according to a fifth embodiment of the present invention.

Further, FIG. 6 shows a terminal structure which does not have a connecting/heat-insulating portion. Although a connecting/heat-insulating portion was formed by use of two flanges in Embodiment 1, this embodiment is configured so that one flange 137 in the outer circumference of the bushing is used while a liquid nitrogen portion 112 and a nitrogen gas reservoir portion 113 are provided in a refrigerant layer. The portion above the flange 137 is connected directly to the room temperature portion with the flange 137 as a border.

Also in this terminal structure, when a space 134 formed inside the bushing communicates with an air gap-portion 142 formed above an insulating oil reservoir, the space inside the bushing is filled with helium gas not liquefied at the very low temperature, as shown in the second embodiment. With such a configuration, any liquefied substance is restrained from occurring inside the bushing. Thus, the insulation performance is prevented from being lowered.

When these space 134 and air gap portion 142 do not communicate with each other, a vacuum is created in the space inside the bushing or the space inside the bushing is filled with helium gas not liquefied at the very low temperature, as shown in the third and fourth embodiments. With such a configuration, any liquefied substance is restrained from occurring inside the bushing so as to suppress an excessive pressure change in the bushing. Thus, the bushing is prevented from being mechanically damaged.

Industrial Applicability

As described above, according to a terminal structure of the present invention, a connecting/heat-insulating portion constituted by a gas phase space formed to be adiabatically connected between a very low temperature portion and a room temperature portion is provided, and this space is filled with gas not liquefied at the very low temperature, or a vacuum is created in this space. Thus, any liquefied substance is restrained from occurring inside the space even at the very low temperature, so that the heat insulation between a conductor portion and the very low temperature portion can be secured.

In addition, an outer circumferential gas phase space connecting the very low temperature portion with the room temperature portion is formed in the outer circumference of the conductor portion, and this space is filled with gas not liquefied at the very low temperature, or a vacuum is created in this space. Thus, any liquefied substance is restrained from occurring inside the space even at the very low temperature. Accordingly, the lowering of insulation performance or an excessive pressure change in the conductor generated with the reduced pressure in the conductor portion can be prevented.

What is claimed is:

1. A terminal structure of cryogenic equipment for leading a terminal of said cryogenic equipment from a very low temperature portion to a room temperature portion through a bushing having a conductor portion at its core, said terminal structure comprising:
   a connecting/heat-insulating portion that is provided between said very low temperature portion and said room temperature portion so as to be connected adiabatically therebetween and to cover an outer circumference of said bushing,
   wherein said connecting/heat-insulating portion is adiabatically connected to said very low temperature portion and said room temperature portion through a very-low-temperature-side flange for sealing said very low temperature portion and a room-temperature-side flange for sealing said room temperature portion.

2. A terminal structure of cryogenic equipment according to claim 1, wherein said two flanges are connected to an outer circumference of said bushing so as to protrude therefrom, and a gas phase space as an adiabatically connecting portion is formed by said two flanges, an outer circumferential surface of said bushing, and an exterior vessel.

3. A terminal structure of cryogenic equipment according to claim 2, wherein a vacuum is in said gas phase space.

4. A terminal structure of cryogenic equipment according to claim 3, wherein said connecting/heat-insulating portion has a double structure of an inner layer portion and an outer layer portion sectioned from each other.

5. A terminal structure of cryogenic equipment according to claim 4, wherein a vacuum is in both of said inner layer portion and said outer layer portion.

6. A terminal structure of cryogenic equipment according to claim 4, wherein only said inner layer portion and not said outer layer portion is filled with gas having a lower boiling point than that of a refrigerant used in said very low temperature portion.

7. A terminal structure of cryogenic equipment according to claim 6, wherein pressure of said gas in said inner layer portion is substantially equal to pressure of said refrigerant in said very low temperature portion.

8. A terminal structure of cryogenic equipment according to claim 1, wherein one of said flanges is fixed while the other flange of said flanges is movable so as to interlock with thermal contraction of said bushing.

9. A terminal structure of cryogenic equipment for leading a terminal of said cryogenic equipment from a very low temperature portion to a room temperature portion through a bushing having a conductor portion at its core, said terminal structure comprising:

a connecting/heat-insulating portion that is provided between said very low temperature portion and said room temperature portion so as to be connected adiabatically therebetween and to cover an outer circumference of said bushing, wherein said bushing has a conductor portion led from said very low temperature portion to said room temperature portion, and an outer circumferential gas phase space connected said very low temperature portion with said room temperature portion along an outer circumference of said conductor portion, wherein said outer circumferential gas phase space is filled with gas not liquefied at a very low temperature, wherein said gas is helium.

10. A terminal structure of cryogenic equipment, comprising a conductor portion led from a very low temperature portion that is cooled by a low temperature gas, to a room temperature portion, characterized in that:

said conductor portion has an outer circumferential gas phase space along an outer circumference of said conductor portion, said outer circumferential gas phase space connecting said very low temperature portion with said room temperature portion, wherein said outer circumferential gas phase space is filled with gas that has a lower boiling point than the low temperature gas, wherein said conductor portion has a hollow pipe and a conductive lead inserted into said hollow pipe so as to have an outer circumferential gas phase space connecting said very low temperature portion with said room temperature portion.

* * * * *